US008812764B2

(12) United States Patent
Futami

(10) Patent No.: US 8,812,764 B2
(45) Date of Patent: Aug. 19, 2014

(54) APPARATUS INSTALLING DEVICES CONTROLLED BY MDIO OR SPI PROTOCOL AND METHOD TO CONTROL THE SAME

(75) Inventor: Ryutaro Futami, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 274 days.

(21) Appl. No.: 13/284,618

(22) Filed: Oct. 28, 2011

(65) Prior Publication Data

US 2013/0111085 A1 May 2, 2013

(51) Int. Cl.
G06F 13/36 (2006.01)

(52) U.S. Cl.
USPC .......................................... 710/311; 710/315

(58) Field of Classification Search
CPC ................................ G06F 13/00; H04L 69/18
USPC .................................................. 710/311, 315
See application file for complete search history.

(56) References Cited

U.S. PATENT DOCUMENTS

| 6,065,068 | A * | 5/2000 | Foote .............................. 710/13 |
| 6,098,117 | A * | 8/2000 | Foote et al. ...................... 710/8 |
| 6,175,932 | B1 * | 1/2001 | Foote et al. ................... 714/5.11 |
| 6,226,762 | B1 * | 5/2001 | Foote et al. ..................... 714/48 |
| 6,701,406 | B1 * | 3/2004 | Chang et al. ................... 710/310 |
| 6,912,361 | B2 * | 6/2005 | Aronson et al. .............. 398/135 |
| 6,963,946 | B1 * | 11/2005 | Dwork et al. ................. 710/310 |
| 6,983,342 | B2 * | 1/2006 | Helenic et al. ................ 710/305 |
| 7,185,134 | B2 * | 2/2007 | Kim et al. ..................... 710/313 |
| 7,440,647 | B2 | 10/2008 | Hosking |
| 7,580,637 | B2 * | 8/2009 | El-Ahmadi et al. .......... 398/135 |
| 7,949,800 | B2 * | 5/2011 | Gelberg et al. .................. 710/19 |
| 7,961,705 | B2 * | 6/2011 | Kennedy et al. .............. 370/349 |
| 8,107,820 | B2 * | 1/2012 | Hotchkiss et al. ............ 398/135 |
| 8,107,821 | B2 * | 1/2012 | El-Ahmadi et al. .......... 398/135 |
| 8,200,473 | B1 | 6/2012 | Dropps et al. |
| 8,412,051 | B2 * | 4/2013 | El-Ahmadi et al. .......... 398/135 |
| 2005/0196165 | A1 | 9/2005 | Dybsetter et al. |
| 2006/0069822 | A1 | 3/2006 | Moriwaki et al. |
| 2006/0088255 | A1 | 4/2006 | Wu et al. |
| 2006/0204246 | A1 | 9/2006 | Suemura et al. |
| 2007/0101043 | A1 * | 5/2007 | Herman ........................ 710/315 |
| 2007/0147844 | A1 | 6/2007 | Harres |
| 2011/0138086 | A1 | 6/2011 | Kwon et al. |
| 2013/0089332 | A1 | 4/2013 | Sauer et al. |

FOREIGN PATENT DOCUMENTS

| JP | 02-035843 A | 2/1990 |
| JP | 2000-029823 A | 1/2000 |
| JP | 2003-308288 A | 10/2003 |
| JP | 2004-153403 A | 5/2004 |

(Continued)

OTHER PUBLICATIONS

IEEE. 802.3. Mar. 8, 2002.*

(Continued)

Primary Examiner — Matthew D Spittle
(74) Attorney, Agent, or Firm — Global IP Counselors, LLP

(57) ABSTRACT

An apparatus including a plurality of internal devices that communicates concurrently with a controller by one of the MDIO protocol and the SPI protocol is disclosed. The controller of the invention couples with respective devices by the point-to-point arrangement. The controller couples with the external apparatus by the MDIO protocol and receives a packet containing an address of one of internal devices, the controller communicates with the device defined by the address by the protocol attributed to the device.

11 Claims, 5 Drawing Sheets

(56) References Cited

FOREIGN PATENT DOCUMENTS

| JP | 2004-297682 A | 10/2004 |
|---|---|---|
| JP | 2006-101163 A | 4/2006 |
| JP | 2006-161163 A | 6/2006 |
| JP | 2008-541299 A | 11/2008 |

OTHER PUBLICATIONS

Texas Instruments. TMS320C6000 DSP Ethernet Media Access Controller/Management Data Input/Output Module Reference Guide. Mar. 2004.*

IEEE. Proposal for an initial draft of a 10GBase-CX4 PMD. Jan. 6, 2003.*

Microchip Technology Inc. Section 23. Serial Peripheral Interface (SPI). 2011.*

Texas Instruments. Keystone Architecture Serial Peripheral Interface. User Guide. Mar. 2012.*

Office Action of the related U.S. Appl. No. 13/367,999, dated Nov. 18, 2013.

Final Office Action of the related application (U.S. Appl. No. 13/367,999), dated Apr. 17, 2014.

Ed Turner et al., "IEEE P802.ae MDC/MDIO", IEEE 802.3 ah Task Force, Copenhagen, Denmark, Sep. 17-19, 2001.

Notification of Reasons for Rejection of the corresponding Japanese application No. 2010-189815, dated Apr. 30, 2014.

* cited by examiner

APPARATUS INSTALLING DEVICES CONTROLLED BY MDIO OR SPI PROTOCOL AND METHOD TO CONTROL THE SAME

BACKGROUND OF THE INVENTION

1. Field of the Invention

The present invention relates to an interface between a host system and a pluggable data link, in particular, the invention relates to in interface protocol between the host system and an optical data link.

2. Related Background Arts

A Japanese Patent published as JP-2004-297682A has disclosed an optical module to provide an arrangement for the host system to access registers in the optical module. Specifically, a processor in the optical module stores data copied from the IEEE register, which is revised in accordance with the 10 Giga-bit attachment unit interface (XAUI), to a virtual register of the IEEE/XENPAK by a preset timing. The processor may output, in response to a request from the media access control layer (MAC), the data that is copied from the IEEE register and stored in the IEEE/XENPAK virtual register through the medium dependent input/output (MDIO) interface. Such an arrangement may realize a unified control of the registers and transmit data within the register promptly in response to a request from the MAC layer.

A Japanese Patent published as JP-2006-101163A has disclosed another optical module directed to solve a mismatching between data stored in the register due to errors, one of which has a type of the high-speed error and detected only by PHYIC, while, the other has another type of the low-speed error and detected only by the DCU. The optical module disclosed therein includes the PHY_LASI_Status register (Link Alarm Status Interrupt), the PHYIC, and the DCU. The PHYIC includes the PHY_LASI_Control register into which the flags to assert/negate the LASI is set depending on the cause of the errors. The DCU has a register that emulates the PHY_LASI_Control register, that is, an alarm control register for deciding to transmit the error externally depending on the type of the error. Generating an UNMASK signal, which may identify the type of the error independent of the cause thereof, and transmitting it to the DCU, the DCU may notify the error to the host system decided by the UNMASK signal and store the data in the PHY_LASI_Status register to the DCU_LASI_Status register.

When the optical module includes a plurality of devices communicating with protocols different from others, the devices may not be controlled by the processor only by managing the registers because destinations and formats are different depending on the communicating protocols. One scheme to solve the subject above has been considered where data to be transmitted are stored in registers in advance to the transmission and the processor defines the destination and converts the format of the data. However, this scheme needs a comparably large memory and restricts the number of devices by the size of the memory.

SUMMARY OF THE INVENTION

An aspect according to the present invention relates to an apparatus communicating with an external apparatus by the MDIO protocol. The apparatus includes a plurality of devices each configured with one of the MDIO protocol and the SPI protocol, and a controller. The controller has a unit to communicate with the devices independently by the point-to-point arrangement. When the controller receives the first MDIO packet from the external apparatus, the controller may transfer the packet to devices by rewriting the port and device addresses in the first packet to port and device addresses specific to the devices when the device is controlled by the MDIO protocol, or discarding the port and device addresses when the device is controlled by the SPI protocol.

In one mode, when the controller receives the second MDIO packet subsequent to the first MDIO packet from the external apparatus and the second MDIO packet instructs the write operation, the controller may transfer the second MDIO packet by rewriting the port and device addresses in the second MDIO packet to the port and device addresses specific to the device defined in the first MDIO packet but rewriting the port and device addresses of the second MDIO packet to a dummy port address and a dummy device address to the device undefined in the first MDIO packet.

In the other mode, when the controller receives the second MDIO packet subsequent the first MDIO packet and the second MDIO packet instructs the read operation, the controller may transfer the second MDIO packet to the devices controlled by the MDIO packet by rewriting the port and device addresses in the second MDIO packet to the port and device addresses specific to the device; read data from respective devices; and transfer the data provided from the device defined by the first MDIO packet to the external apparatus. The data coming from rest devices are discarded by the controller.

BRIEF DESCRIPTION OF THE DRAWINGS

Non-limiting and non-exhaustive embodiments of the present invention will be described with reference to the following figures, wherein like reference numerals refer to like parts throughout the various figures unless otherwise specified.

DETAILED DESCRIPTION OF PREFERRED EMBODIMENTS

Figure 1:
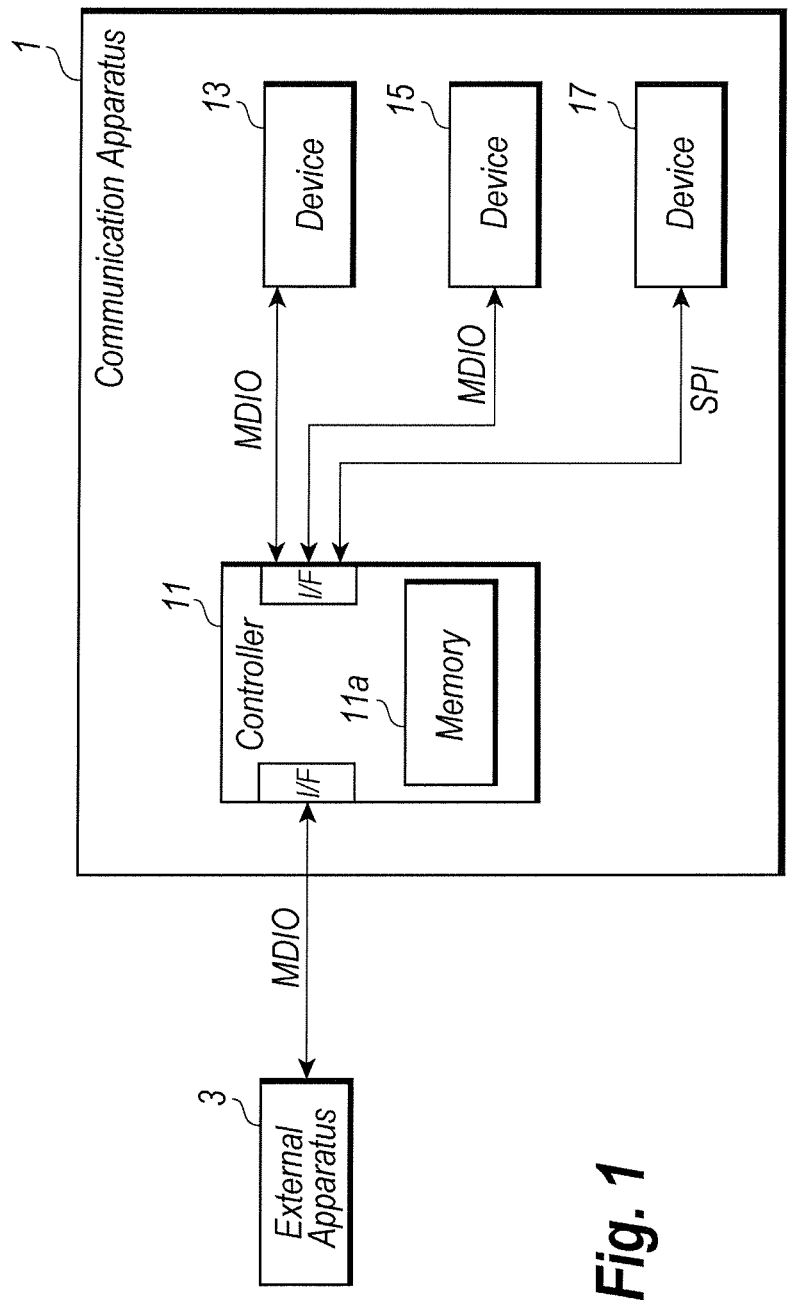
FIG. 1 is a block diagram of an apparatus that installs a plurality of devices each communicating with a controller by one of the MDIO protocol and the SPI protocol.

Next, some preferred embodiments according to the present invention will be described as referring to accompanying drawings. In the description of the drawings, the same element will be referred by the same numeral or the same symbol without iterating the explanation thereof. FIG. 1 is a block diagram of a communication apparatus 1 according to an embodiment of the invention. The apparatus 1 includes a controller 11 and a plurality of devices, 13 to 17.

The controller 11 may provide a central processing unit (CPU), peripheral interfaces, and memories 11a such as ROM and RAM. The CPU executes a sequence stored in the memories 11a to control the operation of the controller 11 comprehensively, especially the peripheral interfaces. The peripheral interfaces may communicate with an external apparatus 3 by the MDIO protocol (Medium Dependent Input/Output) and internal devices, 13 to 15, by the MDIO protocol or the SPI protocol (System Packet Interface). The MDIO protocol and the SPI protocol are one type of serial communication protocols driven by a clock with several mega-hertz (MHz). The specification presented below assumes that the data transmitted by the MDIO protocol is called as the MDIO data or the MDIO packet, while, the data by the SPI protocol is called as the SPI data or the SPI packet.

The memory 11a may store the table data TD that correlates the address of the registers implemented in the device 13 with the device address and the port address each allocated to the device 13; and the address of the registers in the device 15 with the device address and the port address each allocated to the device 15, as shown in table below. The port address allocated to the apparatus 1 are called as the internal port address, while, the register addresses allocated thereto are called as the internal register address.

The controller 11 is coupled with the external apparatus 3. Specifically, the controller 11 may communicate with the external apparatus 3 through the peripheral interface thereof by the MDIO protocol. The controller 11 may also communicate with the internal devices, 13 to 17, in the apparatus 1 by the MDIO protocol or the SPI protocol through the peripheral interface in the arrangement of, what is called, the point-to-point coupling. In the embodiment shown in FIG. 1, the controller 11 may communicate with the devices, 13 and 15, by the MDIO protocol, meanwhile, the device 17 by the SPI protocol.

Receiving the MDIO packet from the external apparatus 3, the controller 11 refers to the address contained in the MDIO packet, to which the MDIO data is to be sent. In a case where the address thus referred indicates the device, 13 or 15, the controller 11 may transmit the MDIO packet to the device, 13 or 15, by the MDIO protocol. Meanwhile, when the address indicates the device 17, the controller 11 may transfer the MDIO packet to the device 17 by the SPI protocol. The address above contained in the MDIO packet coming from the external apparatus 3 invariably contains a register address contained in at least one of devices, 13 to 17.

In an exemplary arrangement, each of the devices, 13 and 15, may be an optical receiving module or an optical transmitting module capable of communicating with the controller 11 by the MDIO protocol. The device 17 may be a temperature sensor, which is able to communicate with the controller 11 by the SPI protocol, to monitor the inner temperature of the apparatus 1.

Two devices, 13 and 15, are unrestricted to those of the optical receiving module or the optical transmitting module. The device 17 is also unrestricted to the temperature sensor. Moreover, the apparatus 1 may include one device implemented with the MDIO protocol, or three or more devices capable of communicating with the controller 11 by the MDIO protocol. The apparatus 1 may include two or more devices implemented with the SPI protocol. The apparatus 1 may include only one type of the device capable of communicating with one of the MDIO protocol or the SPI protocol.

A table 1 below shows a specific example of the port address, the device address, and the register address contained in the MDIO packet sent from the external apparatus 3 to the controller 11. The port address of the apparatus itself may be optionally set by an external pin. The table allocates 00000b for the port address of the apparatus 1. The device address may be generally assigned to be 00001b, 00011b, and/or 00100b. The case of the embodiment assigns 00001b to the device address of the apparatus 1. The register address, which may identify one of devices, 13 to 17, in the apparatus 1 may be assigned to one address from 0000h to 02FFh for the device 13, that from C000h to C3FFh for the device 15, and that from 8000h to 87FFh for the device 17, respectively, in the present embodiment, where "h" in the last character means the number is denoted by the hexadecimal.

TABLE 1

Address Configuration of Communication Apparatus

| | |
|---|---|
| Interface | MDIO |
| PORT ADDRESS | 00000b: optionally settable by external pins |
| DEVICE ADDRESS | 00001b |
| REGISTER ADDRESS | 0000h-02FFh for DEVICE 13 |
| | C000h-C3FFh for DEVICE 15 |
| | 8000h-87FFh for DEVICE 17 |

Table 2 shows an example of the port addresses, the device addresses, and the register addresses of the devices, 13 to 17, in the apparatus. The port address is assigned to respective devices, 13 and 15, communicating with the controller 11 by the MDIO protocol, while, the port address is unnecessary for the last device 17 that communicates by the SPI protocol. In the present embodiment, the port address 00011b is assigned to the device 13, while, the port address 00101b is assigned to the device 15, where the character "b" in the right end means the numerals is denoted by the binary code.

TABLE 2

Address Configuration of Internal Devices

| | DEVICE 13 | DEVICE 15 | DEVICE 17 |
|---|---|---|---|
| Interface | MDIO | MDIO | SPI |
| PORT ADDRESS | 00011b | 00101b | — |
| DEVICE ADDRESS | 00001b | 00100b | — |
| REGISTER ADDRESS | 0000h-02FFh | C000h-C3FFh | 8000h-87FFh |

Meanwhile, the device addresses sent from the controller 11 to the devices, 13 and 15, where they communicate with the controller 11 by the MDI protocol, are assigned to respective devices, 13 and 15; while, the device address is unnecessary for the last device 17 which communicates with the controller 11 by the SPI protocol. The example shown in table 2 assigns the device addresses, 00011b and 00100b, for the devices, 13 and 15, respectively. The register addresses sent from the controller 11 to respective devices, 13 to 17, are the same as those sent from the external apparatus 3 to the controller 11.

The operation of the controller 11 will be described as referring to FIGS. 3 to 6, where they show a format of the packet according to the MDIO protocol sent from/received by the controller 11. In FIGS. 3 to 6, a symbol PRE means a preamble of the MDIO protocol and continues 1 in all 32 bits; a symbol ST means the beginning of the MDIO protocol; a symbol OP denotes the operation code of the MDIO protocol with a width of two bits, which shows an instruction for the controller 11 and often called as a command data. The command data 00b denotes the instruction to define the address, 01b denotes the write instruction, and the command 11b or 10b denotes the read instruction.

The symbol PRTAD means the port address with 5 bits in the MDIO protocol. According to tables above, the PRTAD sent from the external apparatus 3 to the controller 11 includes 00000b corresponding to that defined by the external pin of the apparatus 1; while, PRTAD send from the controller 11 to the device 13 includes 00011b, and that to the device 15 contains 00101b. The symbol DEVAD means the device address with 5 bits in the MDIO protocol. Specifically, DEVAD sent from the external apparatus 3 to the controller 11 includes 00001b, while, DEVAD from the controller 11 to the device 13 contains 00001b, and that to the device 13 contains 00100b.

The symbol TA means "turn around" in the MDIO protocol, which defines a period necessary to switch the mode of the MDIO protocol, that is, switching from the transmitting to the receiving, or from the receiving to the transmitting. The period has a unit of the bit. The symbol ADDRESS denotes the address. Specifically, ADDRESS sent from the external apparatus 3 to the controller 11 contains one of addresses among 0000h-02FFh for the device 13, one of address among C000h-C3FFh for the device 15, and one of addresses among 8000h-87FFh for the device 17.

The symbol DATA means a practical data to be written in the devices, 13 and 15, or a data to be read from the devices, 13 and 15. When OP includes the write instruction, DATA is a data to be written in the device 13 or 15; while, DATA is a data read from the device, 13 or 15, when OP is the read instruction.

Figure 4:
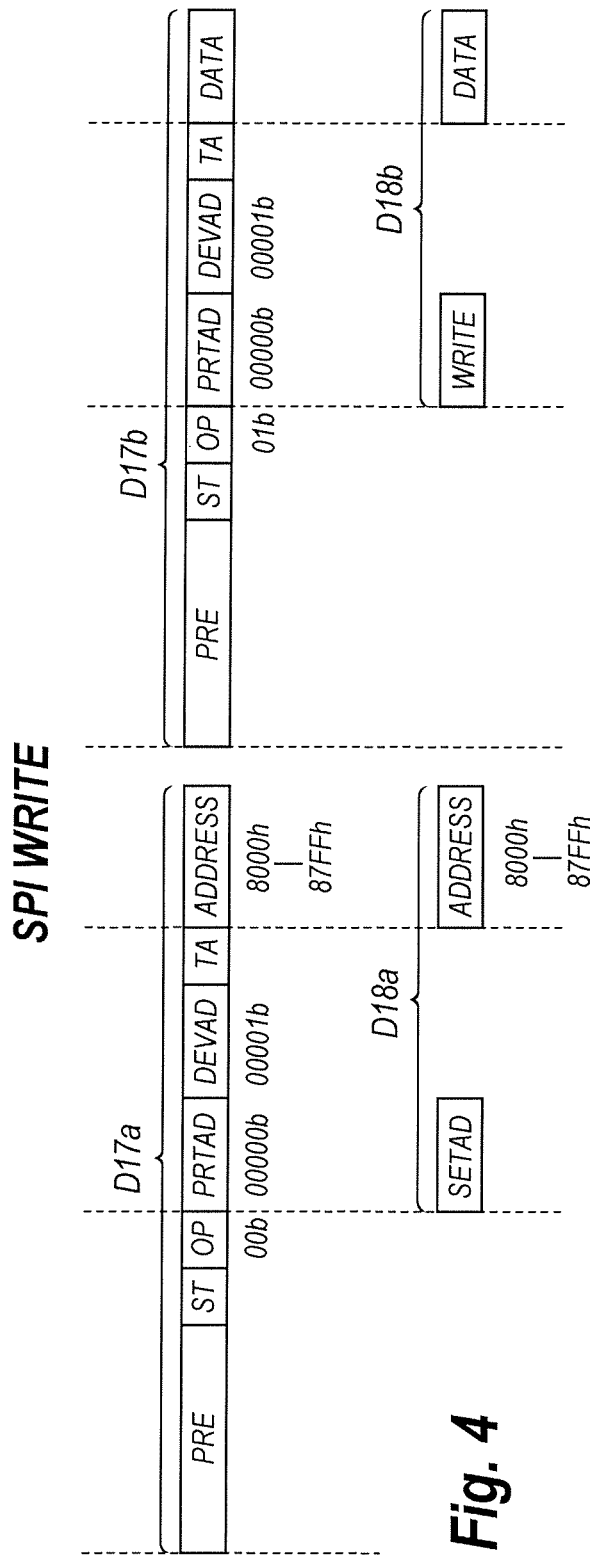
FIG. 4 shows a packet format when the instruction is the SPI WRITE mode.
Figure 5:
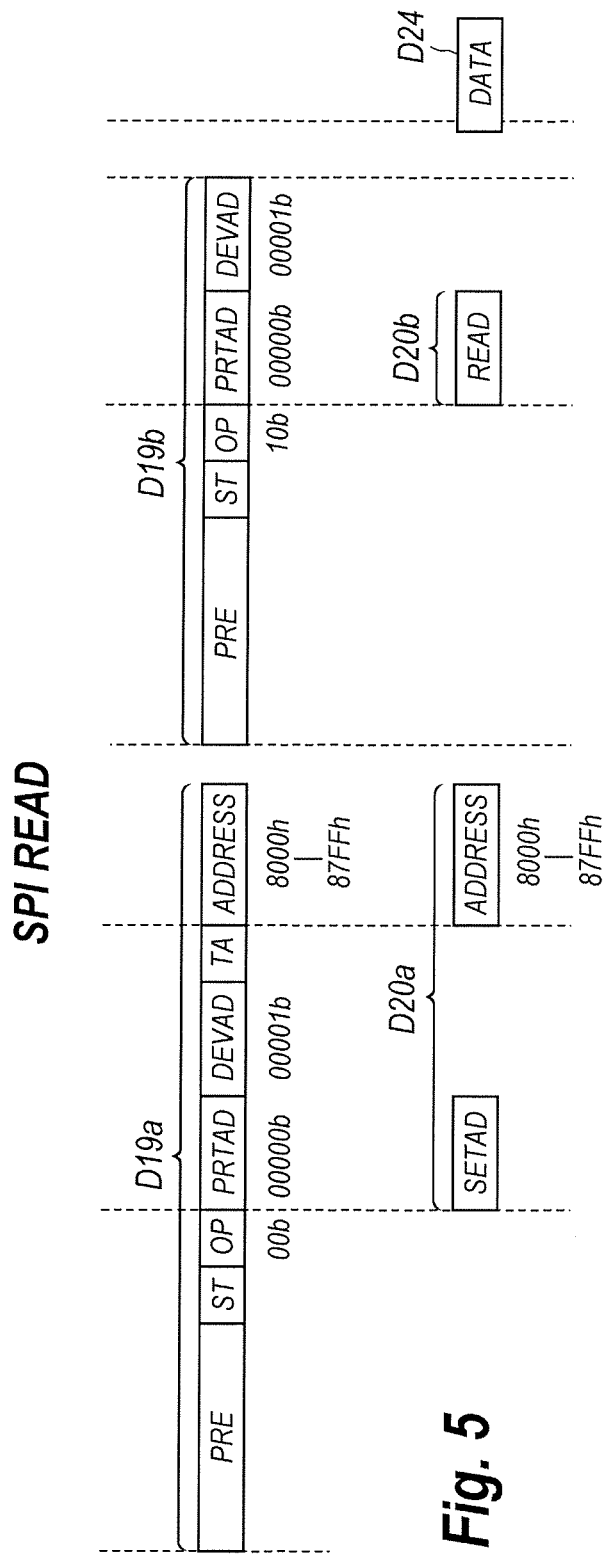
FIG. 5 shows a packet format when the instruction is the SPI READ mode.

Next, the data of the SPI protocol will be described as referring to FIGS. 4 and 5. The SPI protocol contains an operational command like SETAD, WRITE and READ, where they correspond to OP in the MDIO protocol. The operational command in the SPI protocol has the length of 12 bits at most. The symbol SETAD, WRITE, and READ correspond to setting address, writing data, and reading data, respectively. The symbol DATA denotes a practical data to be written in the device 17 when the instruction is WRITE, while, DATA denotes a data read from the device 17 when the instruction is READ.

Figure 2:
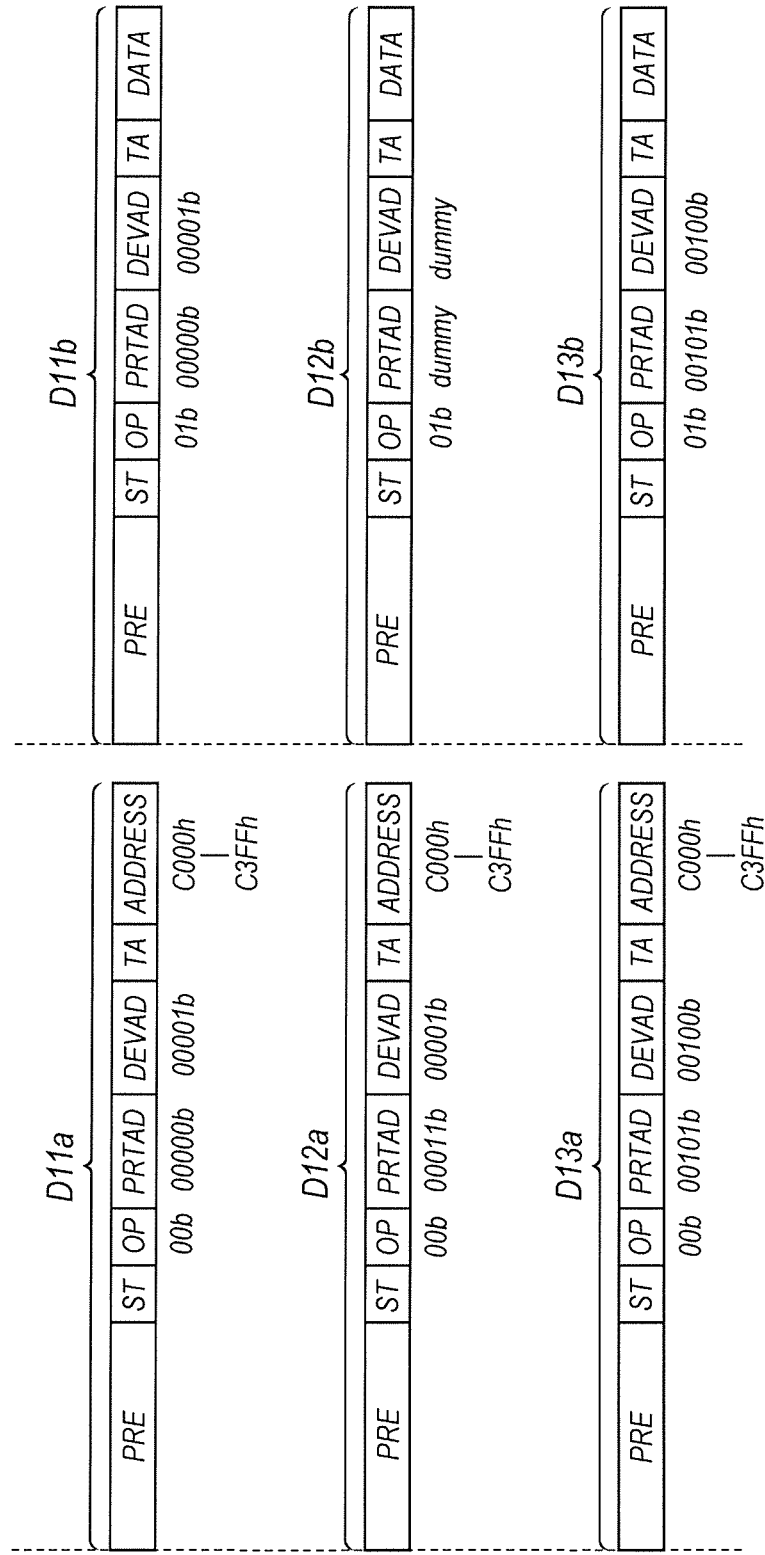
FIG. 2 shows a packet format when the instruction provided from the external apparatus is the MDIO WRITE mode.

Next, the WRITE operation for the MDIO device will be described as referring to FIG. 2 that shows a format of the packet in the write operation, where it assumes a case that a data is to be written in the device 15. The packets, D11a and D11b, show the format of the MDIO protocol as the controller 11 receives them from the external apparatus 3. The packet D11a includes segments of PRE, ST, OP, PRTAD, DEVAD, TA, and ADDRESS; while, the packet D11b includes the same segments with those of the former packet except for DATA in stead of ADDRESS. Packets, D12a and D12b, are also the MDIO data transmitted to the device 13 by the controller 11. Packets, D13a and D13b, are the MDIO packet to be transmitted to the device 15 by the controller 11. These packets, D12a to D13b, include the segments same as those of the former packets, D11a and D11b.

The controller 11 may convert the incoming packet D11a into the outgoing packets, D12a and D13a, in the bit-by bit mode. That is, the controller 11 may transmit the MSB (Most Significant Bit) of the segment PRE of the packets, D12a and D12b, just after the reception of the MSB of the segment PRE of the packet D11a; and so on. The controller 11 may decide, just after the reception of the segment OP of the packet D11a, that the operation of the current packet D11a is to define the address, that is, the controller may anticipate which internal device will be selected.

When the packet D11a is that to define the address, the controller may rewrite the segments, PRTAD and DEVAD, in which the incoming packet D11a sets 00000b and 00001b, respectively, which are the port address and the device address of the present apparatus 1 viewed from the external apparatus 3, into the port address and the device address of respective inner devices, 13 and 15, during the conversion, and continues to transmit the packets, D12a and D13a, to respective devices, 13 and 15. In the present embodiment, the controller 11 sets 00011b and 00001b for the port and device addresses of the device 13, respectively; and 00101b and 00100b for the port and device addresses of the device 15.

Because the controller 11 is coupled with the devices, 13 and 15, by the point-to-point arrangement, the collision between the outgoing packets, D12a and D13a, never occurs even when these packets, D12a and D13a, includes the port and device addressed different from each other and concurrently output from the controller 11.

Until the reception of ADDRESS of the packet D11a, which contains one of register addresses of the inner device 15, the controller may identify that the device object to the operation subsequently defined is the device 15 by referring to ADDRESS and the table TD stored in the memory 11a.

Following to the packet D11a, the controller 11 may receive the next packet D11b, and passes respective bits through the outgoing packets, D12b and D12b, as rewriting the segments, PRTAD and DEVAD, into those of the device 15 for the packet D13b. However, because the controller 11 already identifies that the device object to the operation is the device 15, the segments, PRTAD and DEVAD, of the packet D12b for the device 13 is rewritten to respective dummy addresses unused in the apparatus 1. Just after the reception of OP of the packet D11b, which is 01b in the present example, the controller 11 may identify that the operation defined in the series of the packets is to write a data to one of registers in the device 15.

Finally, after the reception of DATA, which is equivalent to the transmission of DATA to the devices, 13 and 15, concurrently, only the device 15 may write DATA in the register whose address is set by ADDRESS in the former packet, meanwhile, the device 13 may occur no action because PRTAD and DEVAD of the packet D12b defines dummy addresses for the device 13.

Figure 3:
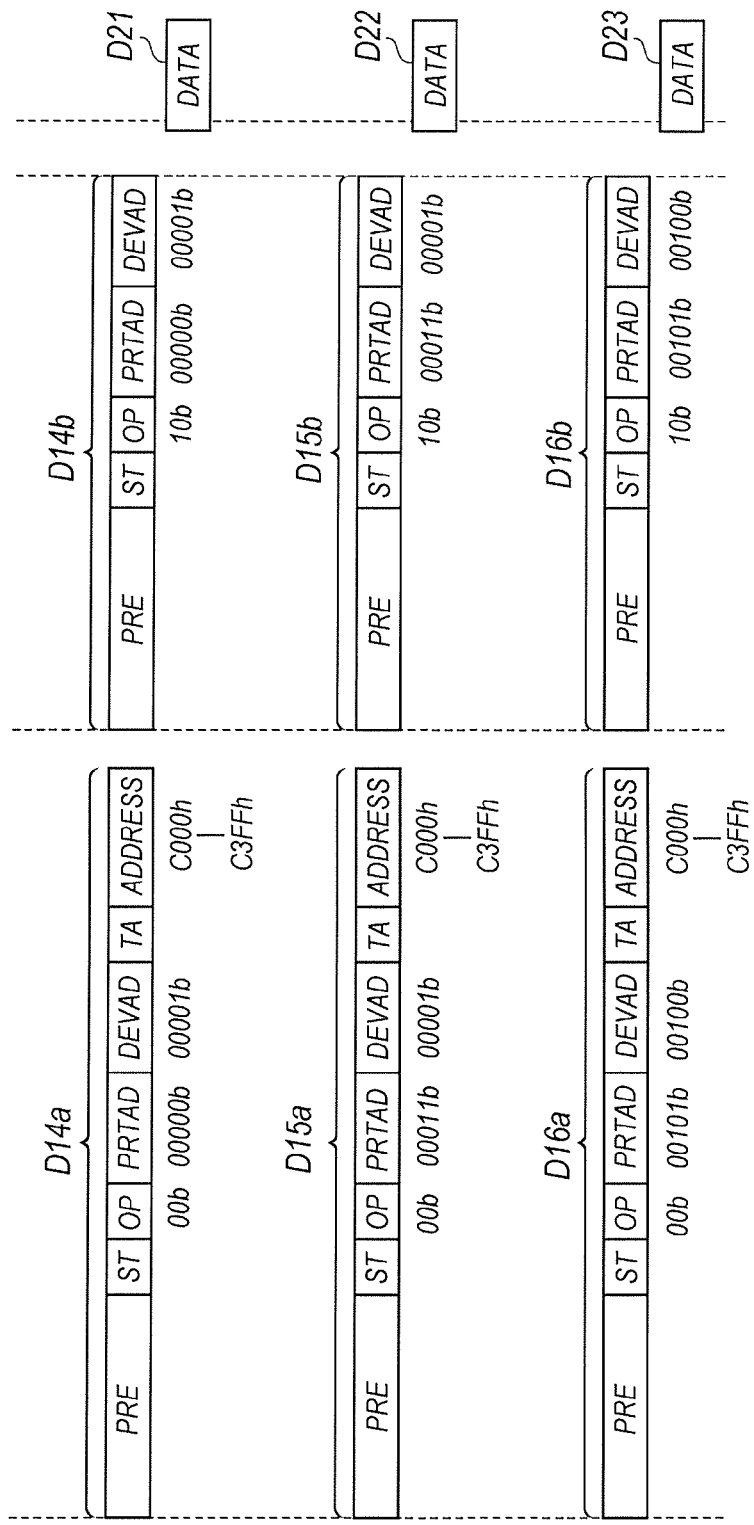
FIG. 3 shows a packet format when the instruction is the MDIO READ mode.

Next, the READ operation for the MDIO device will be described as referring to FIG. 3 which shows the format to read a data from the device 15. Packets, D14a and D14b, have the format received by the controller 11 from the external apparatus 3. Packets, D15a to D14b contain segments of PER, ST, OP, PRTAD, DEVAD, TA, and ADDRESS.

Similar to the WRITE operation, the controller 11 passes the incoming packet D14a through respective devices, 13 and 15, by the outgoing packets, D15a and D15b, concurrently as rewriting PRTAD and DEVAD from 00000b and 00001b to the port and device addresses of the devices, 13 and 15. Because the segment OP of this packet D14a includes the command 00b, which defines that the present packet D14a is for defining the address; accordingly, the controller 11 may rewrite the segments, PRTAD and DEVAD, to those of respective devices, 13 and 15. Until the reception of ADDRESS, the controller 11 may identify the operation is to be done to the device 15.

The controller 11 subsequently receives the packet D14b, and identifies the operation object to the device 15 is to read data therefrom, because the present example sets the segment OP of the packet D14b to be 11b or 10b, which corresponds to READ instruction. As receiving the packet D14b, the controller 11 may convert PRTAD and DEVAD in the packet D16b for the device 15, referring to the table TD in the memory 11a, to those corresponding to the device 15, namely, 00101b and 00100b, respectively in the present example. However, the controller 11 sets the port and device addresses, PRTAD and DEVAD, also in the packet D15b for the device 13 different from the WRITE mode described before. The controller 11 dose not set the dummy port address and the dummy device address in the packet D15b.

Then, the controller 11 may receive the data D22 from the device 13 within a period set by the segment TA of the packet D15a and another data D23 from the device 15 within a period set by the segment TA of the packet D16a. Because the controller 11 already notifies that the MDIO device object to the present instruction is the device 15, the controller 11 may only transfer the data D23 to the external apparatus 3 within a period set by the segment TA of the packet D15a. The period set in TA of the packet D14a, that of the packet D15a and that of the packet D16a are equal to each other.

Because the objective device defined in the segment ADDRESS of the packet D14a is the device 15, not the device 13; the controller 11 may only transfer the data D23 sent from the device 15 and discard the data D22 coming from the device 13. Thus, the device 15 may execute the read instruction set by the packet D16b transmitted through the packet D14b. The packets, D14a to D16a, have the same configuration except for the segments, PRTAD and DEVAD; similarly, the packets, D14b to D16b, have the same arrangement except for the segments, PRTAD and DEVAD.

Next, WRITE operation of the SPI protocol will be described as referring to FIG. 4. Similar to the aforementioned embodiment for the MDIO protocol, the controller 11 receives the packets, D17a and D17b, of the MDIO protocol from the external apparatus 3; each includes segments of PRE, ST, OP, PRTAD, DEVAD, TA, and ADDRESS or DATA. Different from the MDIO protocol, the controller 11 may interpret the MDIO packet D17a without passing segments PRE, ST, OP through the lines connected to the device 17.

The segment OP sets 00b that indicates the operation to be performed by the preset packet is to define the address. Then, the controller 11 starts the transmission of SETAD of the packet D18a just after completion of the reception of the segment OP of the packet D17a; while, starts the segment ADDRESS synchronous with the completion of the segment TA of the packet D17a. Thus, the controller 11 may define the SPI device 17 object to the operation subsequently instructed and the SPIT device may prepare to receive the instruction.

The controller 11 may receive the subsequent packet D17b from the external apparatus 3 which contains practical data to be written in the device defined by the former packet D17a. The controller 11 may skip to transmit segments PRE, ST, and OP on the line to the SPI device 17. Synchronous with the begging of PRTAD, the controller 11 transmits the command WRITE on the line, skips DEVAD and TA, and transmits DATA synchronous with the reception of DATA of the packet D17b in bit-by-bit mode. Because the SPI device 17 prepares to receive data in advance to the reception of WRITE command, the SPI device may store DATA simultaneously to the reception thereof.

Next, READ operation of the SPI device 17 will be described as referring to FIG. 5. similar to those of the former embodiments, two packets, D19a and D19b, are those transmitted from the external apparatus 3 to the controller by the MDIO protocol, and includes segments, PRE, ST, OP, PRTAD, and ADDRESS/DEVAD where those segments are transmitted in the order from left to right as shown in FIG. 6.

In READ operation, the segment OP of the packet D19a is set 00b, which means the packet D19a defines the address, while, the segment OP of the packet D19b is set 11b or 10b to show that the operation of the packet D19b is READ instruction. The segment ADDRESS of two packets, D19a and D19b, set the register address of the device 17. Other two packets, D20a and D20b, are the packet transmitted from the controller 11 to the SPI device 17, where the configuration of the packets, D20a and D20b, has the SPI protocol. The packet D20a includes segments of SETAD and ADDRESS, while, the other packet D20b includes segments of READ and DATA. The segments DATA contains data to be transmitted from the SPI device 17 to the controller 11.

The controller 11 starts the transmission of the segment SETAD synchronous with the completion of the segment OP of the packet D19a, and the transmission of the segment ADDRESS at the completion of the reception of the segment TA. Moreover, synchronous with the reception of the segment OP of the packet D19b, the controller starts the transmission of the segment READ.

Specifically, the controller 11 may decide by the segment OP of the packet D19a that the currently receiving packet D19a is to define the address, and may further decide, at the completion of the segment ADDRESS of the packet D19a and the table TD, that the device object to the operation defined in the segment OP of the packet D19b is the device 17. The segment ADDRESS of the packet D20a is transmitted concurrently with the reception of the segment ADDRESS of the packet D19a. The segment ADDRESS of the packet D20a is identical with that of the packet D19a.

Furthermore, the controller 11 may decide by the segment OP of the packet D19b that the packet D19b is the read instruction. Then, synchronous with the completion of the segment OP, the controller starts the transmission of the segment READ, and transmits the segment DATA received from the device 17 with a lag set by the segment TA of the packet D19a. Thus, the SPI device 17 may carry out the read instruction set by the packet D19b synchronous with the packet D20b output from the controller 11.

Thus, the controller 11 in the apparatus 1 may follow both of the MDIO protocol and the SPI protocol, devices, 13 to 17, installed within the apparatus 1 may communicate with the external apparatus 3 independent of the protocol implemented with respective devices. Moreover, external data contained in the MDIO protocol may be transmitted to the destination device by referring to the address implemented within the external data, which may adjust the number of devices in the apparatus without arranging the size of the memory 11a.

The configuration of the embodiment allocates the inner port address specific to the apparatus, which may simplify the selection of the devices without allocating a new address for each device. The destination device may be specified by using the inner table TD, which is stored in the memory 11a; accordingly, the configuration may only revise the inner table TD without re-arranging the size of the memory 11a when the apparatus newly installs an inner device. The configuration thus described may allocate a dummy address not practically used in the apparatus 1 for the device non-objective to the instruction, which may reliably prevent the write operation in the non-object device.

Moreover, the packet implementing the SPI protocol, which is generated by the controller 11, contains the instructions corresponding to the MDIO protocol; accordingly, the controller 11 may convert the instruction contained in the packet from the external apparatus 3 and following the MDIO protocol into the packet following the SPI protocol. Arranging the width of the packet of the SPI protocol to be less than 12 bit, the time for converting to the MDIO protocol, and transmitting by the MDIO protocol may be shortened.

In the foregoing detailed description, the method and apparatus of the present invention have been described with reference to specific exemplary embodiments thereof. However, it will be evident that various modifications and changes may be made thereto without departing from the broader spirit and scope of the present invention. The present specification and figures are accordingly to be regarded as illustrative rather than restrictive

What is claimed is:

1. An apparatus communicating with an external apparatus by an MDIO protocol, comprising:
a plurality of devices each configured with one of the MDIO protocol and an SPI protocol; and
a controller having a unit to communicate with the devices independently by a point-to-point arrangement, the controller communicating with the external apparatus by the MDIO protocol,
wherein the controller transfers the MDIO packet provided from the external apparatus to respective devices by rewriting port and device addresses to port and device addresses specific to respective devices when the devices are controlled by the MDIO protocol, or by discarding port and device addresses when the devices are controlled by the SPI protocol.

2. The apparatus of claim 1,
wherein the controller, when the MDIO packet provided from the external apparatus defines one of devices in the apparatus and the defined device is controlled by the MDIO protocol, generates an MDIO packet for the device by converting the port address and the device address in the received MDIO packet into a port address and a device address specific to respective devices; and transmits the converted packet to respective devices.

3. The apparatus of claim 2,
wherein the controller includes a table that co-relates the port address and the device address of the device with addresses of registers contained in the devices,
wherein the controller defines the registers to an operation defined in the packet provided from the external apparatus by referring to the address set in the address of the MDIO protocol and the table.

4. The apparatus of claim 3,
wherein the addresses of the registers are specific to respective devices and different from each other.

5. The apparatus of claim 2,
wherein the controller sets, when an operation defined in the MDIO packet provided from the external apparatus is a write instruction, a dummy port address and a dummy device address in an MDIO packet to be transmitted to the device undefined in the MDIO packet from the external apparatus.

6. The apparatus of claim 1,
wherein the apparatus includes at least one device controlled by the MDIO protocol and another at least one device controlled by the SPI protocol.

7. The apparatus of claim 6,
wherein the one device controlled by the MDIO protocol is one of an optical receiving module and an optical transmitting module, and
wherein the other one device controlled by the SPI protocol is a temperature sensor.

8. A method to control a plurality of devices by a controller each installed in an apparatus, the devices each configured with one of the MDIO protocol and the SPI protocol, the controller being coupled with respective devices in the point-to-point arrangement, the method comprising steps of:
receiving a first MDIO packet from an external apparatus;
when the first MDIO packet defines an address specific to one of devices, transferring the first MDIO packet to the device controlled by the MDIO protocol as rewriting port and device addresses contained in the first MDIO packet to port and device addresses each specific to respective devices;
receiving a second MDIO packet from an external apparatus; and
when the second MDIO packet defines a WRITE instruction and contains a data to be written in the device defined in the first MDIO packet, transferring the second MDIO packet concurrently to the devices controlled by the MDIO packet as rewriting port and device addresses contained in the second MDIO packet to port and device addresses specific for the defined device, or to a dummy port address and a dummy device address for the undefined device.

9. A method to control a plurality of devices by a controller each installed in an apparatus, the devices each configured with one of the MDIO protocol and the SPI protocol, the controller being coupled with respective devices in the point-to-point arrangement, the method comprising steps of:
receiving a first MDIO packet from an external apparatus by the controller;
when the first MDIO packet defines an address specific to one of devices, transferring the first MDIO packet to the device controlled by the MDIO protocol as rewriting port and device addresses contained in the first MDIO packet to port and device addresses each specific to respective devices;
receiving a second MDIO packet from an external apparatus by the controller;
when the second MDIO packet defines a READ instruction, transferring the second MDIO packet concurrently to the devices controlled by the MDIO packet as rewriting port and device addresses contained in the second MDIO packet to port and device addresses specific for the devices; and
reading data by the controller from respective devices controlled by the MDIO protocol, and discarding data provided from devices undefined by the first MDIO packet.

10. A method to control a plurality of devices by a controller each installed in an apparatus, the devices each configured with one of the MDIO protocol and the SPI protocol, the controller being coupled with respective devices in the point-to-point arrangement, the method comprising steps of:
receiving a first MDIO packet from an external apparatus by the controller;
when the first MDIO packet defines an address specific to one of devices, transferring the first MDIO packet to the device controlled by the SPI protocol as discarding port and device addresses contained in the first MDIO packet;
receiving a second MDIO packet from an external apparatus by the controller;
when the second MDIO packet defines a WRITE instruction, transferring the second MDIO packet concurrently to the devices controlled by the SPI packet as discarding port and device addresses contained in the second MDIO packet.

11. A method to control a plurality of devices by a controller each installed in an apparatus, the devices each configured with one of the MDIO protocol and the SPI protocol, the controller being coupled with respective devices in the point-to-point arrangement, the method comprising steps of:
receiving a first MDIO packet from an external apparatus by the controller;
when the first MDIO packet defines an address specific to one of devices, transferring the first MDIO packet to the device controlled by the SPI protocol as discarding port and device addresses contained in the first MDIO packet;
receiving a second MDIO packet from an external apparatus by the controller;

when the second MDIO packet defines a WRITE instruction, transferring the second MDIO packet concurrently to the devices controlled by the SPI packet as discarding port and device addresses contained in the second MDIO packet; and
receiving a data from the device defined by the first MDIO packet.

* * * * *